Dec. 14, 1937.                    C. A. TEA                    2,102,393
                              WEATHER STRIP
                            Filed March 27, 1936

INVENTOR.
Clark A. Tea.
BY
Harness, Lind, Patee & Harris
ATTORNEYS.

Patented Dec. 14, 1937

2,102,393

UNITED STATES PATENT OFFICE 2,102,393

WEATHER STRIP

Clark A. Tea, Detroit, Mich., assignor to Chrysler Corporation, Highland Park, Mich., a corporation of Delaware Application March 27, 1936, Serial No. 71,127

2 Claims. (Cl. 20—69)

This invention relates to a weatherstrip and more particularly to a weatherstrip especially adapted for use on motor vehicle bodies to seal the opening around the doors or windows.

Another object of the invention is to provide a weatherstrip which is strong, inherently resilient, and inexpensive to manufacture.

Another object of the invention is to provide a weatherstrip, the parts of which are easily assembled and retained in assembled position by stitching.

A further object of the invention is to provide a weatherstrip which is free to bend laterally in applying the same to a curved opening.

A further object of the invention is to provide a weatherstrip which has sufficient resiliency to cause it to tightly engage the door or window for sealing purposes and yet adapted to take a permanent set when bent beyond its elastic limit so that in applying the weatherstrip to an opening it may be bent beyond its elastic limit to conform to any irregularities around the opening, and after being bent to that position possesses sufficient resiliency to flex within given limits.

More specifically stated, the invention consists in applying a preformed resilient wire to the central portion of a cushioning part of the weatherstrip and extending the wire into an attaching portion so that the parts are connected together in such a manner that relative bending movement is resiliently resisted.

Other objects and advantages of the invention will more fully appear from the following description, taken in connection with the accompanying drawing, in which.

Figure 1:
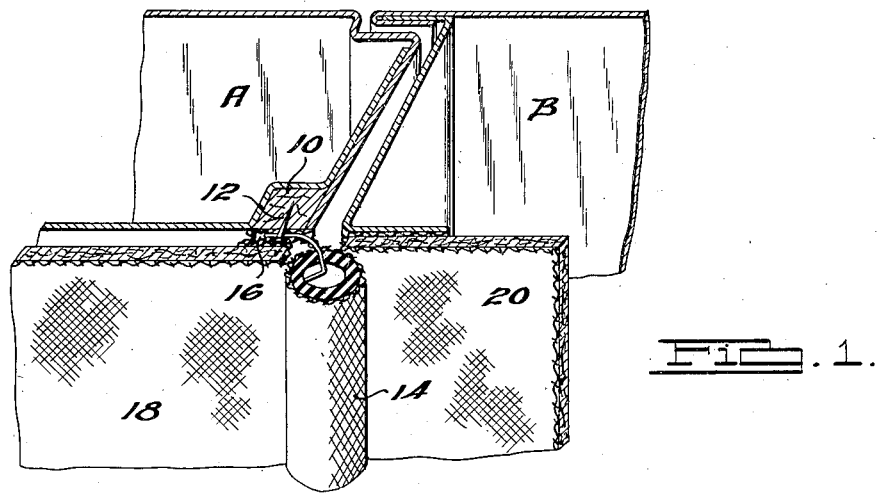
Fig. 1 is a perspective view, parts being broken away and in section, of one application of the device as applied to an automobile door opening.

Referring to the drawing, I have illustrated a portion of an automobile body frame at A and a door at B. The frame is provided with a tacking insert 10 to which the weatherstrip is secured such as by tacks 12.

The weatherstrip comprises a cushioning member 14 and an attached flanged tacking strip 16, the latter being secured to the tacking insert 10. As illustrated, a panel member 18 is secured to the frame A overlapping the flanged tacking strip 16. The inner panel of the door is shown at 20.

The cushioning member is preferably formed from a tubular resilient member such as rubber and is split longitudinally as at 22 to permit the insertion of a preformed wire 24, the latter having a portion extending into the hollow of the tube and a portion extending radially from the outer periphery of the tube to form an attaching portion. Surrounding the cushioning member 14 I have provided a fabric cover 26, the free edges of which are stitched as at 28 to the radially extending portion of the wire forming the attaching portion 16 and securing the parts together in a unitary structure.

In this form of my invention I have preformed a wire into loops by reversely bending the wire at regular intervals so that there are diagrammatic portions lying in a substantially flat plane. At one edge of the wire member 24 I have alternately bent the loops in opposite directions, as indicated at 30. These portions extend substantially at right angles to the plane of the looped wire member and have a length equal to the radial dimension of the opening in the cushioning member 14.

The ends of these portions 30 engage the inner periphery of the cushioning member 14 at opposite points, urging the cushioning member into close contact with the closure member for the opening.

It is important to select a wire having a deflection characteristic which, when bent within limits, is elastic but when bent beyond its limits takes a base set and is elastic from that bent position. This is important when the weatherstrip is applied to an irregular surface. For example, the strip may be manually bent beyond its elastic limit to fit an irregular surface but when so bent it is elastic from that bent position. I have found that a wire suitable for this purpose should have an elastic limit between 250,000 lbs. per square inch and 350,000 lbs. per square inch and may be formed from what is commonly termed music wire having a diameter of approximately one sixty-fourth of an inch.

Figure 2:
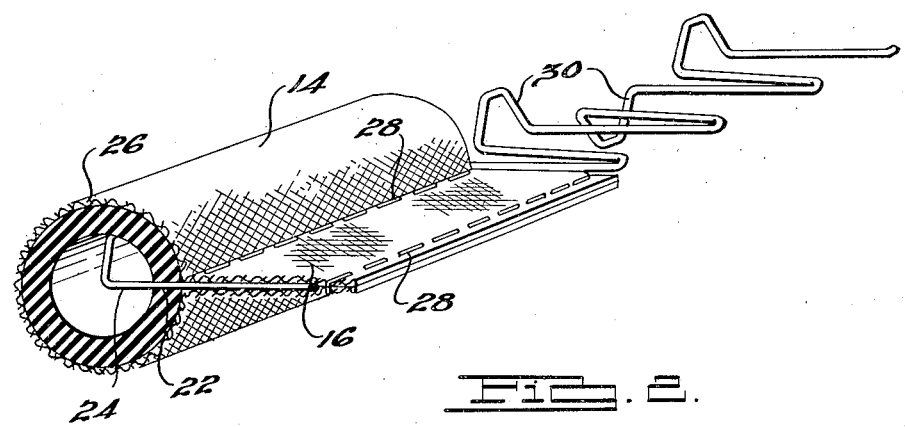
Fig. 2 is a perspective view of the weatherstrip alone, parts thereof being broken away and in section.

Forming the wire into a zigzag shape, as disclosed in Fig. 2, it is readily possible to bend the weatherstrip in any direction such as is required in securing the strip to a curved surface or in going around a corner of the door opening or the like.

Although but several specific embodiments of the invention have herein been shown and described, it will be understood that various changes in the size, shape and arrangement of parts may be made without departing from the spirit of my invention.

What is claimed is:

1. A weatherstrip comprising a tubular member of resilient material, a resilient wire member having portions alternately bent to form a continuous strip of loops in a substantially flat plane, alternate loops at one side of the strip being bent in opposite directions at right angles to the plane of the strip and enclosed within said tubular member, the opposite edge of said strip projecting radially beyond the outer periphery of said tubular member, and a fabric covering secured to said tubular member and said wire member.

2. A weatherstrip comprising a tubular resilient portion, a flat securing portion projecting radially from said tubular portion, and looped wire within both portions alternately contacting the opposite faces of the inner periphery of said tubular portion.

CLARK A. TEA.